Dec. 22, 1964     L. RONGVED ETAL     3,162,396
SPATIAL ORIENTATION OF ACTIVE SATELLITE REPEATERS
Filed May 31, 1961     2 Sheets-Sheet 1

CONICAL REGION OF ACTIVE RECEPTION AND TRANSMISSION

BICONICAL REGION OF INADEQUATE RECEPTION AND TRANSMISSION

INVENTORS   L. RONGVED
               I. E. YU
BY
ATTORNEY

Dec. 22, 1964          L. RONGVED ETAL          3,162,396
SPATIAL ORIENTATION OF ACTIVE SATELLITE REPEATERS
Filed May 31, 1961                                    2 Sheets-Sheet 2

INVENTORS  L. RONGVED
           I. E. YU
BY
           ATTORNEY

United States Patent Office 3,162,396
Patented Dec. 22, 1964

3,162,396
SPATIAL ORIENTATION OF ACTIVE
SATELLITE REPEATERS
Leif Rongved and Irving E. Yu, both of New Providence, N.J., assignors to Bell Telephone Laboratories, Incorporated, New York, N.Y., a corporation of New York
Filed May 31, 1961, Ser. No. 113,709
7 Claims. (Cl. 244—1)

This invention relates to earth satellites and more particularly to the control of the spatial orientation of an earth satellite.

A satellite employed as an active radio repeater, or in a similar fashion, requires the reception and transmission of radio waves between the satellite and earth stations. Since such operation typically involves the use of microwave frequencies, it is necessary that there be line-of-sight or optical path contact between the satellite and an earth station.

Active repeater satellites equipped with nonisotropic antennas, that is, directive antennas, require less power than does a satellite that acts as a point source and has an isotropic antenna pattern. Therefore, it is obvious that a satellite for this application will advantageously be equipped with a directive antenna, thereby necessitating the control of the spatial orientation or attitude of the satellite with respect to the earth so that the principal radiation pattern will coincide with the desired optical path.

It is known that the earth's magnetic field can be used to control or maintain the attitude of a satellite. Two possible passive attitude controls are spin stabilization, that is, sustained spin to stabilize by the gyroscopic effect, and magnetic orientation, that is, interaction of a permanent magnet within the satellite with the geomagnetic field much like the needle of a compass wherein the satellite follows the magnet. Attitude control by spin stabilization is disclosed in the copending application of C. C. Cutler, Serial No. 829,817, filed July 27, 1959, now U.S. Patent 3,048,350, issued August 7, 1962. Attitude control by magnetic orientation is disclosed in an article entitled "Control of Earth Satellite Motions by Magnetic Devices," by R. E. Fischell, in the Applied Physics Laboratory of Johns Hopkins University's publication APL/JHU/TG 60–31.

There are also active attitude controls (those requiring a source of energy within the satellite vehicle) that utilize the geomagnetic field. For example, an electric dipole may be formed and located within the satellite. This electric dipole may thereafter be aligned with the electric field that is present when an object moves through a magnetic field so that the satellite can thereby be oriented.

A slightly more complex or sophisticated attitude control is the one that utilizes the earth's gravitational field. The first order effect of this gravitational field is to keep the satellite in orbit. When the satellite is of other than spherical configuration, such as a prolate spheroid or an ellipsoid, for example, the second order effect of the gravitational field is to keep one side of the satellite facing the earth. These two effects of the earth's gravitational field are evidenced by the moon, which has a prescribed orbit such that the same side of the moon always faces the earth.

When the somewhat simpler magnetic orientation is employed, however, it becomes necessary to reduce any initial spin or rotational motion of the satellite relative to the geomagnetic field about other than a chosen axis to zero so that the magnetic dipole within the satellite can become aligned with the geomagnetic field. This is also generally true for satellites utilizing the electric dipole for orientation and for a satellite whose attitude is controlled by the earth's gravitational field.

Typically, the satellite may be launched by a multi-stage vehicle with no remote guidance of the last stage. In such cases the last stage, and the satellite are given an initial spin of several hundred revolutions-per-minute to promote stability of the last phase of the launching process. If remote guidance of the last stage is provided, the spin is not required but the satellite will in most instances be released without any predetermined motion and may be taken as initially having a random tumbling motion. In either case, it is necessary to provide damping means to reduce the initial motion to zero before the attitude control can take effect.

The damping means may take one of several known forms. For example, it may be of the shorted-coil type, the eddy current type, or the hysteresis type, all of which are discussed in the Fischell article, supra. In this article, it is shown that all of these damping means are dependent upon the square of the geomagnetic induction, since they are all initially magnetically and electrically inert and require a magnetic field to produce the propensity to interact with the earth's magnetic field to produce the retarding torque for damping. It is obvious that the effectiveness of these damping means will decrease as the altitude of the satellite is increased, since the strength of the earth's magnetic field also decreases with increasing altitude. If, for example, the satellite were operating at an altitude of 2400 miles from the surface of the earth, the intensity of the geomagnetic induction over the equator would be approximately 0.1 gauss. Therefore, the square of this geomagnetic induction is small. Since this geomagnetic induction varies approximately as the inverse of the cube of the distance from the satellite to the center of the earth, the effectiveness of these known damping means decreases very rapidly as the satellite's altitude is increased beyond this 2400-mile point.

It is therefore an object of the present invention to provide a damping means whose effectiveness is dependent directly upon the geomagnetic induction rather than the square thereof. It is also an object of the present invention to provide a damping means that has a constant damping torque despite changes in angular velocity of the satellite relative to the damping means.

In accordance with the invention, therefore, a damping means is provided comprising at least one permanent magnet or magnetic dipole and means for mounting this magnet within and for rotation relative to the satellite, the mounting means having frictional contacts between the magnet and said satellite to oppose relative motion therebetween, such frictional contacts being of equal magnitude on all sides of said magnet.

These and other features and advantages of the invention will appear more clearly and fully upon consideration of the following specification taken with the drawings in which.

Figure 2:
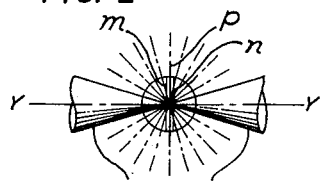
FIG. 2 illustrates a typical antenna pattern derived from the use of a circumferential slot antenna.
Figure 6:
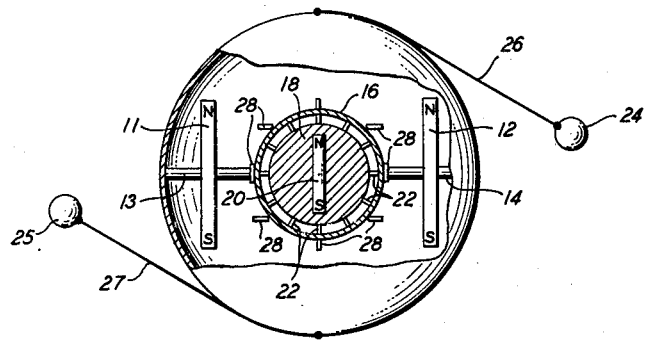
FIG. 6 is a representation of a magnetically oriented satellite partially cut away to show the positioning of the damping means in accordance with the invention within the satellite.
Figure 7:
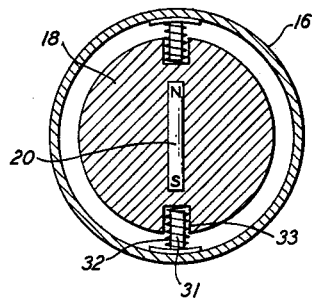
Figure 8:
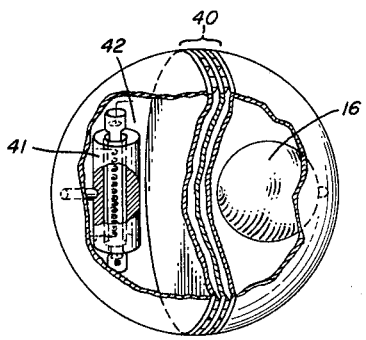

FIG. 7 is a representation of an optional damping means that may be advantageously employed in place of the damping means shown in FIG. 6; and FIG. 8 is a representation of a magnetically oriented satellite partially cut away to show a travelling wave tube therein, the circumferential slot antenna of FIG. 2 in greater detail, and the positioning of the damping means within the satellite in accordance with the invention.

For a better understanding of the need and the operation of the damping means in accordance with the invention shown in FIGS. 6 and 7, some of the fundamentals of spatial orientation will first be considered with reference to FIGS. 1 through 5.

A satellite repeater may use one or more of several antennas, each having its own distinctive pattern, depending upon the requirements of the particular satellite application. The following discussion is directed to the application of an antenna that is directive in general and to the use of an antenna that is known to be suited for communications by satellite in particular.

Figure 1:
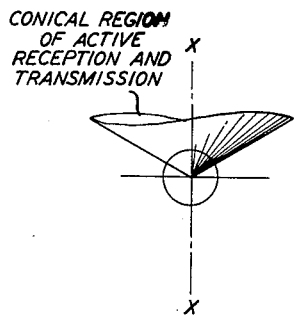
FIG. 1 is a representation of a typical antenna pattern derived from the use of a directional horn antenna.

The antenna pattern is one of the two main factors which determine the location of the magnetic dipole of the magnetic orientation means or the design and positioning of any of the other orientation means. The other factor is the orbital path of the satellite which may be either an equatorial, an inclined, or a polar orbit. FIG. 1 is a representation of a typical antenna pattern obtained when an antenna that is generally directive is employed. The signals are transmitted or received in the conical region which is symmetrical about the axis X–X.

Another antenna that is suitably adapted for use in a satellite has the antenna pattern illustrated in FIG. 2. The antenna employed is of the type generally disclosed in the copending application of C. C. Cutler, Serial No. 73,121, filed December 1, 1960, and comprises parallel plate feeds to peripheral apertures $m$ and $n$ lying in substantially parallel planes. Such an antenna is pictorially shown in FIG. 8 as antenna 40. The antenna pattern illustrated in FIG. 2 is symmetrical with respect to the axis Y–Y and is also symmetrical with respect to the equatorial plane P which is perpendicular to the axis Y–Y. A characteristic of the pattern of this circumferential slot antenna is the biconical region wherein the signal is too weak for satisfactory reception or transmission.

Figure 3:
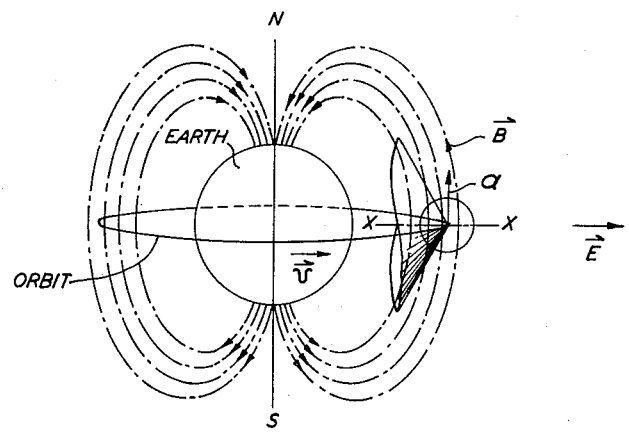
FIG. 3 is a sketch representing a magnetically oriented satellite equipped with the antenna shown in FIG. 1 and revolving about the earth in an equatorial orbit.

When a satellite revolving in an equatorial orbit and having the antenna pattern shown in FIG. 1 is employed as an active radio repeater, it possesses the desired orientation when the axis of symmetry points toward the center of the earth, as shown in FIG. 3. In FIG. 3, assuming magnetic orientation, the north seeking pole of the magnetic dipole is represented by the arrowhead along the line $a$ which is perpendicular to the axis of symmetry X–X of the antenna pattern. The satellite is represented as traveling in an equatorial orbit so that the northern and southern hemispheres of the earth essentially have simultaneous line-of-sight contact by way of the satellite. It is apparent from FIG. 3 that the magnetic dipole must be perpendicular to the axis of symmetry to give this desired orientation. However, it is seen that the satellite may still rotate about an axis parallel to the axis of the magnetic dipole, thereby requiring an additional attitude control to effect the desired orientation.

When a satellite is moving through a magnetic field, there is an electric field also present. The electric field ($\vec{E}$), in the case of a satellite in an equatorial orbit, is found to have a direction normal to the surface of the earth and can be found by taking the vector cross product of the velocity of the satellite ($\vec{v}$) and the magnetic flux density or magnetic induction ($\vec{B}$) of the earth in the orbital path of the satellite. If an electric dipole is placed in the satellite with its axis parallel to this electric field found by the above cross product and parallel to the axis of symmetry X–X of the antenna pattern, the desired attitude will be maintained. Orientation by an electric dipole has the disadvantage of requiring the utilization of power to form the electric dipole. However, as above discussed, it may sometimes be used to advantage notwithstanding the requirement of a power source.

Whether or not an electric dipole is used for purposes of attitude control, an active repeater satellite requires a power source for the signal handling equipment. The source most commonly employed involves a storage battery maintained under charge by an array of solar cells. It has been found that there is excessive radiation damage to the solar cells when a satellite is revolving in the equatorial orbit. For this reason, as well as others involving mutual visibility at the land terminals, a satellite may advantageously be made to travel in an inclined orbit or even in a polar orbit where the radiation damage is found to be greatly reduced. Only the polar orbit will be considered hereinafter.

When the satellite of FIG. 2, having the antenna pattern which is symmetrical with respect to the axis of symmetry Y–Y of the satellite and is also symmetrical with respect to the equatorial plane P of the satellite, is employed, it is apparent that the attitude control for this satellite should orient the satellite in such a way that the axis of symmery is always normal to the orbital plane. Thus, in FIG. 4, the magnetic dipole utilized in magnetic orientation and represented by the arrow $a$ is perpendicular to the axis of symmetry of the satellite.

Figure 4:
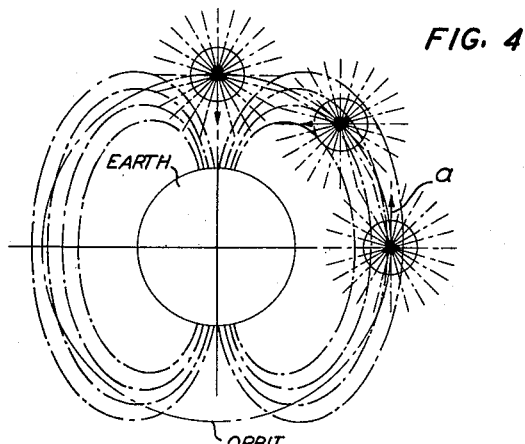
FIG. 4 is a sketch representation of a magnetically oriented satellite equipped with the antenna shown in FIG. 2 and revolving about the earth in a polar orbit, while rotating about an axis parallel to the axis of symmetry of the antenna pattern.
Figure 5:
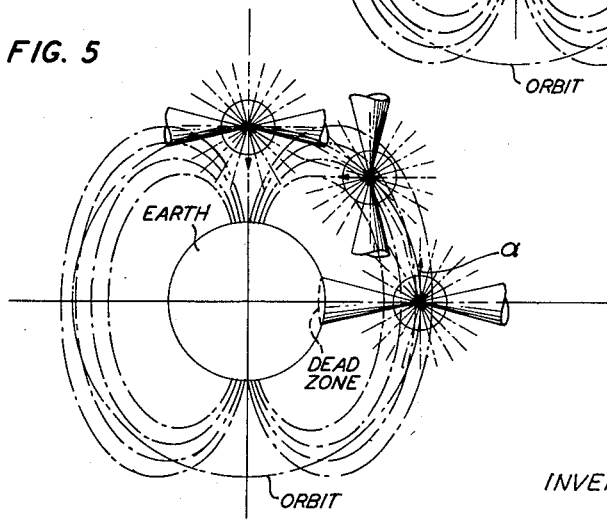
FIG. 5 is a representation of a magnetically oriented satellite equipped with the antenna shown in FIG. 2 and revolving about the earth in a polar orbit, while rotating about an axis perpendicular to the axis of symmetry of the antenna pattern.

Under some circumstances, for example, where the satellite is substantially spherical, the rotation of the satellite may be about an axis that is perpendicular to both the axis of symmetry of the satellite and the axis of the magnetic dipole $a$ as shown in FIG. 5. If such a condition does exist, an electric dipole with alternating polarization can be employed so that the axis of rotation will be the one desired, as shown in FIG. 4. Additionally, or in the alternative, the satellite may be further passively oriented by making the satellite a non-spherical body; for example, an oblate spheroid, rather than a spherical body, so that the earth's gravitational field may align the axis of minimum moment of inertia, thereby making the axis of symmetry which has maximum moment of inertia the axis of rotation.

All of the orientation schemes considered above with reference to FIGS. 1–5 of the drawings involve the application of necessarily small forces to produce the attitude controlling adjustments. It is obvious that such gross errors as spin resulting from launch or random tumbling must be eliminated if the orientation means is to be effective. Thus, before the magnetic dipole orientation means can effectively orient the satellite, it is necessary that the initial rotational motion of the satellite be reduced substantially to zero. Therefore, and in accordance with the invention, the damping means of FIG. 6 may advantageously be employed. In FIG. 6, the means for effecting magnetic orientation is shown as comprising two permanent magnets 11 and 12 which are secured within the satellite so that they have no relative motion with respect to the satellite. Therefore, the satellite will thereafter follow the path chosen by the magnetic dipoles.

It is noted that the magnet utilized to effect the magnetic orientation may, in the interest of economy of space and weight, be the magnet of a traveling wave tube that may conveniently be utilized in either the transmitter or receiver of the active satellite. By properly orienting the magnet of the traveling wave tube within the satellite, it is possible to attain the desired orientation of the satellite with respect to the earth. The employment of magnet 41 of a travelling wave tube 42 in the mangetic orientation of a satellite is shown in FIG. 8.

The magnets 11 and 12 of FIG. 6 are shown as being supported and secured to the satellite by supports 13 and 14, which may also support a non-magnetic spherical container 16 which forms the container for the damping means in accordance with the invention. Positioned symmetrically within container 16 is a hard, smooth, non-magnetic sphere 18 which supports a magnetic dipole 20. Sphere 18 is represented in the drawing as being solid. However, it should be noted that this sphere may be hollow and suitable provisions may be made therein for the support of dipole 20. Sphere 18 floats on non-magnetic metal reeds 22, which are equally spaced within and around the spherical container 16.

For illustrative purposes, the damping means is shown as being centrally located within the satellite. However, for proper operation of the damping means, it should be located concentrically with the center of mass of the satellite. The sphere 18 will float on the reeds 22 because the satellite in orbit will be in a substantially weightless state and, when sphere 18 is located with its center situated at the center of mass of the satellite, there will be equal force or friction between each reed 22 and the sphere 18. Thereafter, the retarding torque about the centroid of the satellite produced by the frictional mounts will be a constant per revolution regardless of the magnitude of the relative motion.

The magnitude of the friction between the sphere 18 and the reeds 22 is determined by the pressure that the reeds exert on the sphere and also by the condition of the contiguous surfaces. The spherical container 16 serves the purpose of retaining the sphere 18 during launching and may be pressure-sealed to maintain the original friction coefficient between the surfaces of the sphere and the metal reeds.

A number of small compensating magnets 28 are located around and attached to the spherical container 16 to compensate for the magnetic field of the traveling wave tube or magnets 11 and 12 in much the same manner as the magnetic compensation of a ship's compass. As a result, in the spherical region where the magnet 20 is located, the geomagnetic field will dominate.

In practice, the size of the damping means would be somewhat smaller in proportion to the satellite than would appear from the illustrative drawing.

When the satellite is initially launched into orbit, the magnet 20 of the damping means will have a hunting action similar to that of the needle of a compass. This hunting action will be in the nature of a small free oscillation of the magnet relative to the earth's magnetic induction. The period of this free oscillation is determined by the magnetic moment and moment of inertia of the magnet. It can be shown that the period of small free oscillation of the damping magnet must be less than the product of the period of rotation of the satellite and the square root or two, or the damping magnet will rotate with the satellite and will not be able to become aligned with the geomagnetic field. Therefore, when the satellite has an initial spin such that the period of rotation is less than this critical value, it will be necessary to employ additional damping means to decrease this initial spin so that the damping means in accordance with the invention can become effective.

The additional damping means may take the form of any of those described in the Fischell article, supra, or may be of the gravitational type illustrated in FIG. 6. This additional damping means of the gravitational type comprises two weights 24 and 25 tied on directly opposite sides of the satellite by wires 26 and 27, respectively. The two weighted balls are released at an appropriate time to swing diametrically opposite each other on the selected lengths of wire. This mechanism, previously used in satellites, is sometimes called a "yo-yo de-spin mechanism." When the wires are normal to the surface of the satellite, the weights will escape from the satellite.

An optional damping means in accordance with the invention is shown in FIG. 7. In place of the metal reeds of FIG. 6 frictional contacts comprising pistons 31 in contact with the inner surface of spherical container 16 are substituted. The pistons 31 are located diametrically opposite each other and maintain a constant pressure against the container 16 as determined by springs 32. The pistons 31 and springs 32 are held in place in recesses 33 in the sphere 18 at opposite ends of magnet 20. The friction or retarding torque is determined by the tension of the springs 32 and the condition of the surfaces in contact between the spherical container 16 and pistons 31.

There may be included in the damping means of FIG. 7 a multiplicity of spring loaded pistons. The damping means of FIG. 7 has the advantages over the damping means of FIG. 6 of being easier to construct and having a simpler adjustment for retarding friction. In both figures the magnet of the damping means is depicted as being a slender bar magnet. However, it is to be understood that the shape and size of the damping magnet will be determined by the particular application and available material and may, therefore, be other than a bar magnet.

Although specific embodiments of the invention have been shown and described, it will be understood that they are but illustrative and various modifications may be made therein without departing from the scope and spirit of the invention.

What is claimed is:

1. In an earth satellite, means for reducing substantially to zero initial rotational motion of said satellite about any axis, said means comprising at least one permanent magnet, and means for mounting said magnet within and for rotation relative to said satellite, said mounting means having frictional contacts between said magnet and said satellite to oppose relative motion therebetween.

2. In an earth satellite employing spatial orientation means, said orientation means having an effectiveness that increases as the initial rotational motion of said satellite about an axis decreases, means for decreasing said initial motion comprising at least one permanent magnet, and means for mounting said magnet within and for rotation relative to said satellite, said mounting means having frictional contacts between said magnet and said satellite to oppose relative motion therebetween.

3. In an earth satellite, means for reducing substantially to zero the initial rotational motion of said satellite about any axis, said means comprising at least one permanent magnet embedded in a non-magnetic spherical shell, a spherical container having a diameter slightly greater than the diameter of said spherical shell, and non-magnetic metallic reeds equally spaced around the interior of said container and in physical contact with said spherical shell, said spherical container being mechanically attached to said satellite, said spherical shell being supported by said non-magnetic reeds and capable of rotating restrictively upon said reeds with respect to said spherical container, thereby producing a retarding torque for motion of said satellite relative to the motion of said magnet.

4. In an earth satellite, means for reducing substantially to zero the initial rotational motion of said satellite about any axis, said means comprising at least one permanent magnet embedded in a non-magnetic spherical shell, a spherical container having a diameter slightly greater than the diameter of said spherical shell, said spherical shell having at least two diametrically opposite recesses in the outer surface, compression springs inserted in said recesses and physically connected to said shell, and pistons inserted in said springs and in physical contact with the inner surface of said container, said spherical container being mechanically attached to said satellite, said spherical shell being supported by said pistons and capable of rotating restrictively with respect to said spherical container, thereby producing a retarding torque for motion of said satellite relative to the motion of said magnet.

5. In an earth satellite, means for decreasing substantially to zero the initial rotational motion of said satellite about any axis, said means comprising at least one permanent magnet and means for mounting said magnet within and for restricted rotation relative to said satellite, said magnet oscillating with respect to the earth's magnetic field, and means for rapidly reducing said initial motion so that the period of rotation of said satellite will be greater than the period of oscillation of said damping means divided by the square root of two, thereby allowing said decreasing means to become effective.

6. In an earth satellite acting as an active radio repeater, a traveling wave tube having a permanent magnet employed as an active element therein, said permanent magnet being utilized as a magnetic orientation means for said satellite, means for decreasing the initial motion of said satellite so that said magnet may become aligned with the earth's magnetic field, said decreasing means comprising at least one permanent magnet, and means for mounting said magnet within and for rotation relative to said satellite, said mounting means having frictional contacts between said satellite and said magnet of said decreasing means to oppose relative motion therebetween.

7. In a nonspherical earth satellite employing gravitational attitude control, means for reducing substantially to zero the initial rotational motion of said satellite about any axis, said means comprising at least one permanent magnet, and means for mounting said magnet within and for rotation relative to said satellite, said mounting means having frictional contacts between said magnet and said satellite to oppose relative motion therebetween.

References Cited in the file of this patent

UNITED STATES PATENTS 2,602,895    Hansen _____ July 8, 1952

OTHER REFERENCES

Advances in Space Science, vol. 2, 1960, Academic Press, Inc., New York.